United States Patent
Coman et al.

(10) Patent No.: US 11,977,556 B2
(45) Date of Patent: *May 7, 2024

(54) DETERMINATION OF RESULT DATA FOR SMALL MULTIPLES BASED ON SUBSETS OF A DATA SET

(71) Applicant: Microsoft Technology Licensing, LLC, Redmond, WA (US)

(72) Inventors: Anca Gentiana Coman, Seattle, WA (US); John Herschel Vulner, Kirkland, WA (US); Jonathan Christian Ludwig, Seattle, WA (US); Justin Evan Schneider, Seattle, WA (US); Ramy Saroufim, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,065

(22) Filed: Jan. 31, 2023

(65) Prior Publication Data

US 2023/0169083 A1 Jun. 1, 2023

Related U.S. Application Data

(63) Continuation of application No. 17/121,377, filed on Dec. 14, 2020, now Pat. No. 11,593,391.

(51) Int. Cl.
*G06F 16/248* (2019.01)
*G06F 16/22* (2019.01)
*G06F 16/2455* (2019.01)
*G06F 16/27* (2019.01)

(52) U.S. Cl.
CPC ........ *G06F 16/248* (2019.01); *G06F 16/2264* (2019.01); *G06F 16/24556* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 8,977,982 B1* | 3/2015 | Amacker | G06F 3/014 |
| | | | 715/786 |
| 10,783,214 B1* | 9/2020 | Rowe | G06F 16/904 |
| 2008/0183735 A1* | 7/2008 | Bruckner | G06F 16/289 |
| 2017/0118308 A1* | 4/2017 | Vigeant | H04N 7/15 |

\* cited by examiner

*Primary Examiner* — Dawaune A Conyers
(74) *Attorney, Agent, or Firm* — Mannava & Kang, P.C.

(57) ABSTRACT

According to examples, an apparatus may include a processor and a memory on which is stored machine-readable instructions that when executed by the processor, may cause the processor to receive a request for result data from a requestor and determine queries to create the result data. The processor may determine a subset of a data set based on the queries. The subset of the data set may be displayed in small multiples by the requestor. The processor may output the subset of the data set as the result data to the requestor. In some examples, the processor may receive a request for additional result data from the requestor. The processor may determine a second subset of the data set to be displayed in the small multiples and output the second subset of the data set as the additional result data to the requestor.

20 Claims, 7 Drawing Sheets

FIG. 5A

| CONTINENT | YEAR | SALES |
|---|---|---|
| AFRICA | 2010 | 1.5 M |
| AFRICA | 2011 | 1 M |
| ASIA | 2013 | 2 M |
| AUSTRALIA | 2011 | 0.7 M |
| AUSTRALIA | 2012 | 0.9 M |
| EUROPE | 2010 | 2 M |
| EUROPE | 2011 | 3 M |

FIG. 5B

| CONTINENT | YEAR | SALES |
|---|---|---|
| AFRICA | 2010 | 1.5 M |
| AFRICA | 2011 | 1 M |
| ASIA | | |

FIG. 5C

| CONTINENT | YEAR | SALES |
|---|---|---|
| AFRICA | 2010 | 1.5 M |
| AFRICA | 2011 | 1 M |
| ASIA | | |
| AUSTRALIA | 2011 | 0.7 M |
| EUROPE | 2010 | 2 M |
| EUROPE | 2011 | 3 M |

FIG. 5D

| CONTINENT | YEAR | SALES |
|---|---|---|
| AFRICA | 2010 | 1.5 M |
| AFRICA | 2011 | 1 M |
| ASIA | 2013 | 2 M |
| AUSTRALIA | 2011 | 0.7 M |
| AUSTRALIA | 2012 | 0.9 M |
| EUROPE | 2010 | 2 M |
| EUROPE | 2011 | 3 M |

DETERMINATION OF RESULT DATA FOR SMALL MULTIPLES BASED ON SUBSETS OF A DATA SET

PRIORITY

This application is a Continuation of commonly assigned and co-pending U.S. patent application Ser. No. 17/121,377, filed Dec. 14, 2020, the disclosure of which is hereby incorporated by reference in its entirety.

BACKGROUND

Computing devices may display small multiples, which may be a series of similar graphs or charts. In some examples, the small multiples may display data associated with multiple dimensions.

BRIEF DESCRIPTION OF THE DRAWINGS

Features of the present disclosure are illustrated by way of example and not limited in the following figure(s), in which like numerals indicate like elements, in which:

FIGS. 5A to 5D show diagrams of subsets of a data set for small multiples in which an outer dimension value may be preserved when the outer dimension value is reachable by scrolling an inner dimension data, in accordance with an embodiment of the present disclosure;

DETAILED DESCRIPTION

Figure 1:
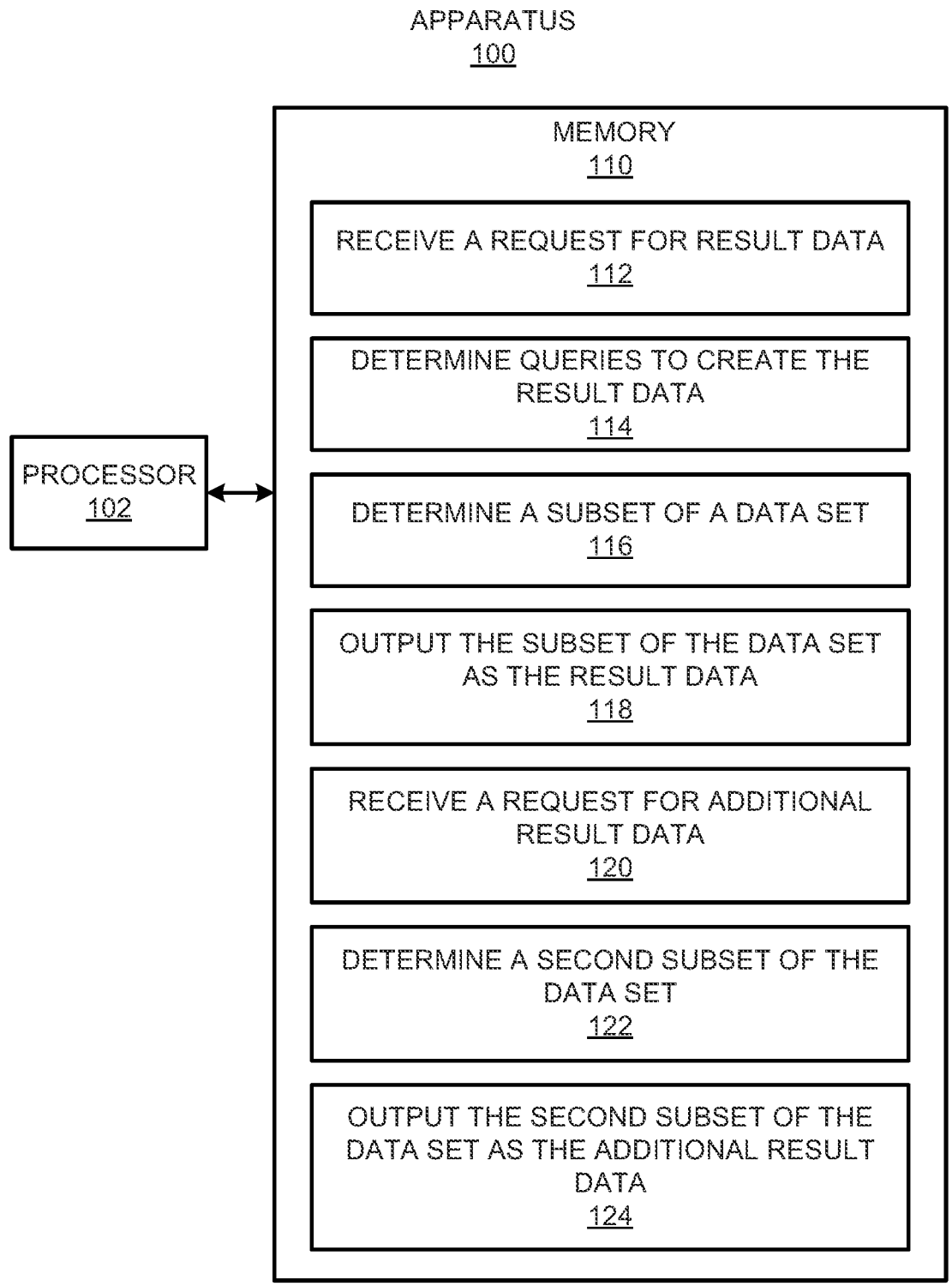
FIG. 1 depicts a block diagram of an apparatus that may determine a subset of a data set to be output as result data to be displayed in small multiples, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Small multiples may be a series of similar graphs or charts, which may use similar axes or scales and displayed together, enabling them to be easily compared to each other. For instance, small multiples may split a visual into multiple versions of the visual, presented side-by-side, with the data of the visual partitioned across the multiple versions by a chosen dimension. As such, small multiples may facilitate comparisons between different categories within a data set. In some examples, a server may generate the small multiples from data sets and may communicate the generated small multiples to a client machine.

However, a concern associated with small multiples, for instance, small multiples corresponding to large data sets, may be that the small multiples may include a relatively large amount of data. As a result, the communication of data corresponding to the small multiples may consume a relatively large amount of bandwidth. In some instances, the bandwidth usage may be wasted as a user may not need to view all of the small multiples. In other instances, creation of these small multiples may become cumbersome and time-consuming for the user, for instance to manually create multiple visuals and set appropriate parameters for each instance of the small multiples.

Disclosed herein are apparatuses, systems, methods, and computer-readable media that may enable efficient generation and communication of small multiples by loading the data set for the small multiples in subsets of data or in small groups of result data. As discussed herein, a processor, e.g., a server, may receive a request for result data from a requestor, e.g., a client, via a network. The request may identify a subset of the data set to be outputted as the small multiples. In some examples, a user input may enable selection of the subset of the data set to enable relatively quick and easy expansion and contraction of the result data that is displayed in the small multiples by the requestor. For instance, a scroll bar for a particular dimension of the small multiples may be displayed by the requestor and data for the small multiples may be loaded in increments corresponding to an input at the scroll bar.

In some examples, the processor may determine a subset of a data set and may output the subset as the result data to be displayed in the small multiples by the requestor. The processor may receive a request for additional result data from the requestor and may determine a second subset of the data set to be output as the additional result data. In addition, the requestor may stitch and display the result data and the additional result data together in the small multiples.

Through implementation of the features of the present disclosure, a processor may enable output of a subset of a data set as result data to be displayed in small multiples in a relatively efficient and user-friendly manner. The improved performance which may result from loading a subset of the data set may in turn allow an apparatus to generate visuals of the small multiples in an efficient manner, for instance, by reducing an amount of time and processing resources used to identify, retrieve, update, and modify a content and format of data to be displayed in each small multiple. Additionally, the processor may enable use of a user input, such as a scroll input at the small multiples, to quickly and easily identify additional subsets of the data set to be loaded. The improved user interface to request additional data may facilitate a more efficient operation of the apparatus, enabling the user to more quickly and easily access functions of the apparatus to identify, retrieve, update, and modify the content and format of the data for the small multiples.

Figure 2:
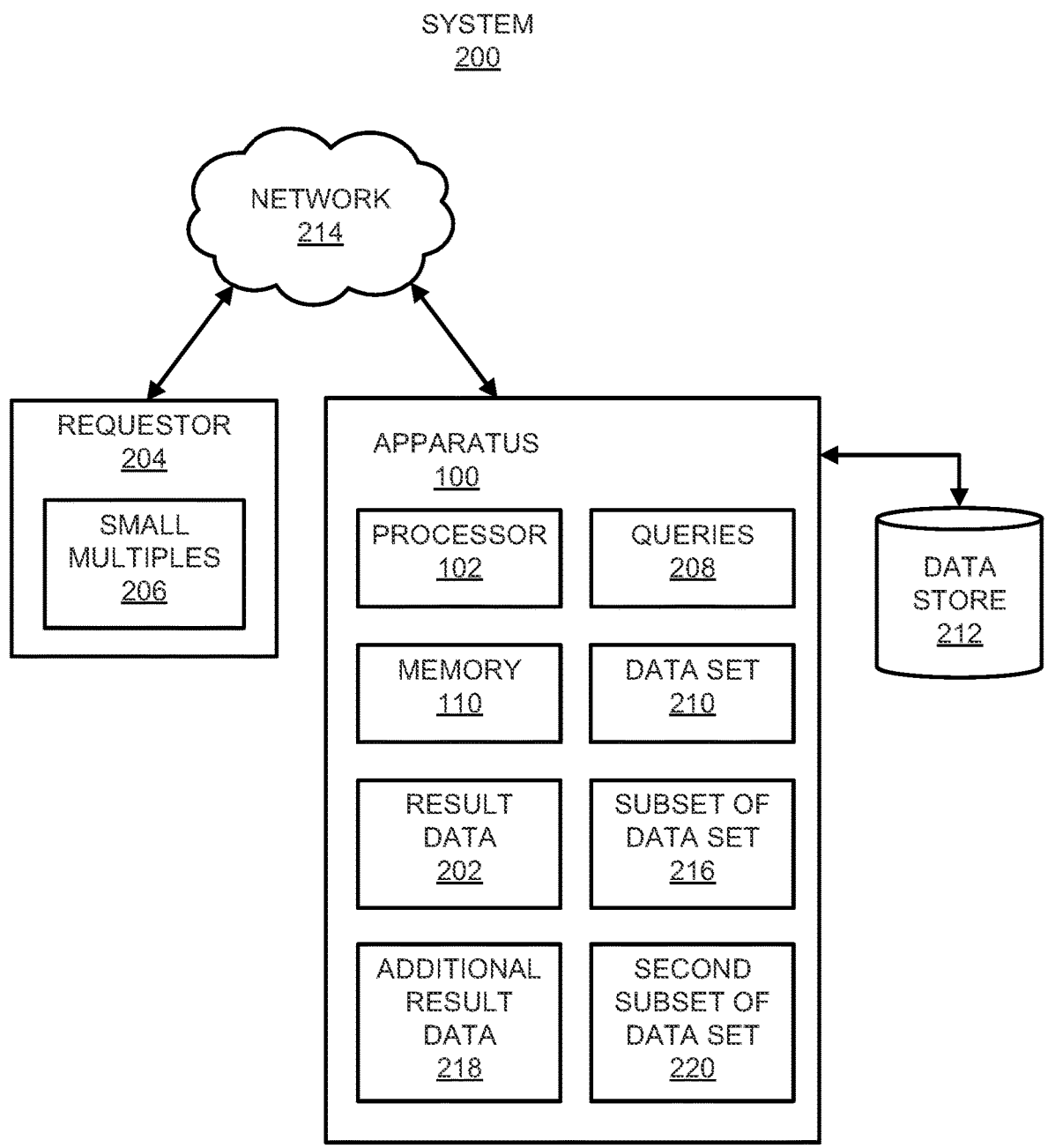
FIG. 2 shows a block diagram of a system within which the apparatus depicted in FIG. 1 may be implemented, in accordance with an embodiment of the present disclosure.
Figure 3:
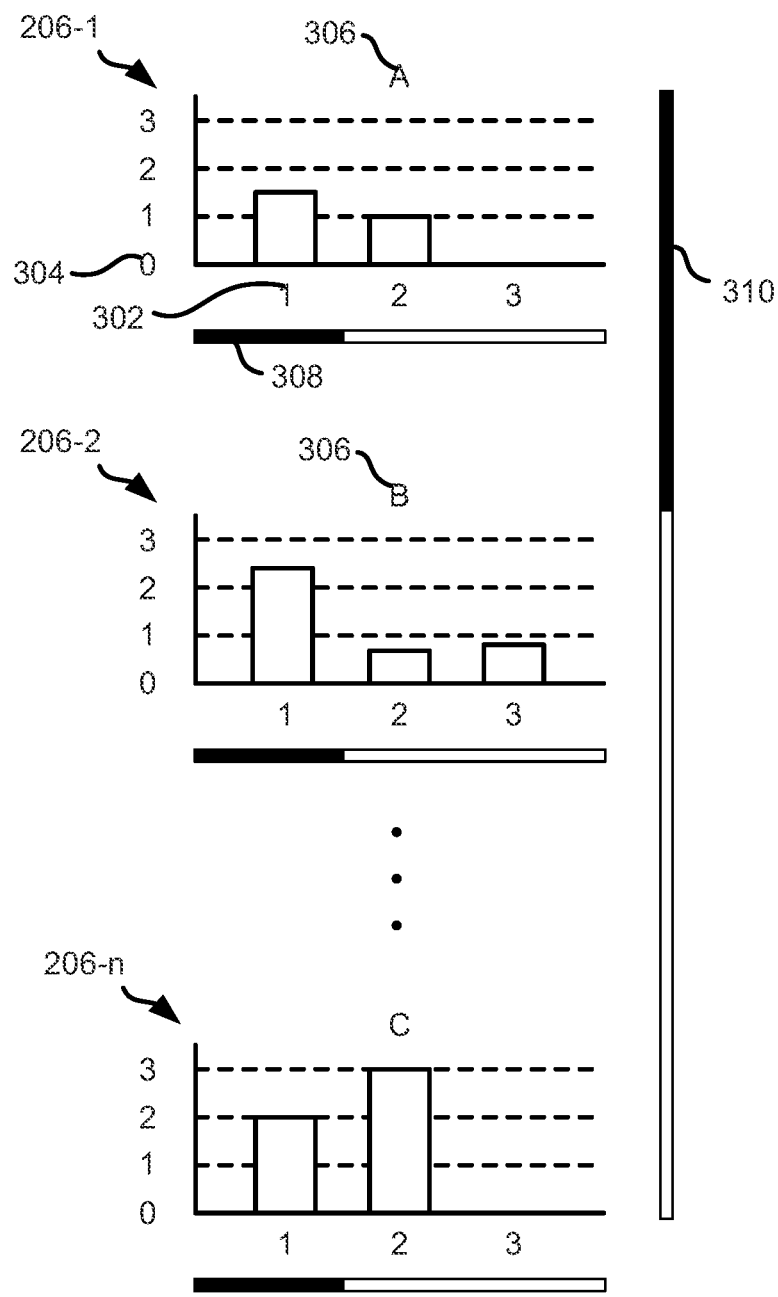
FIG. 3 shows a diagram of small multiples in which a subset of a data set may be displayed, in accordance with an embodiment of the present disclosure.
Figure 4:
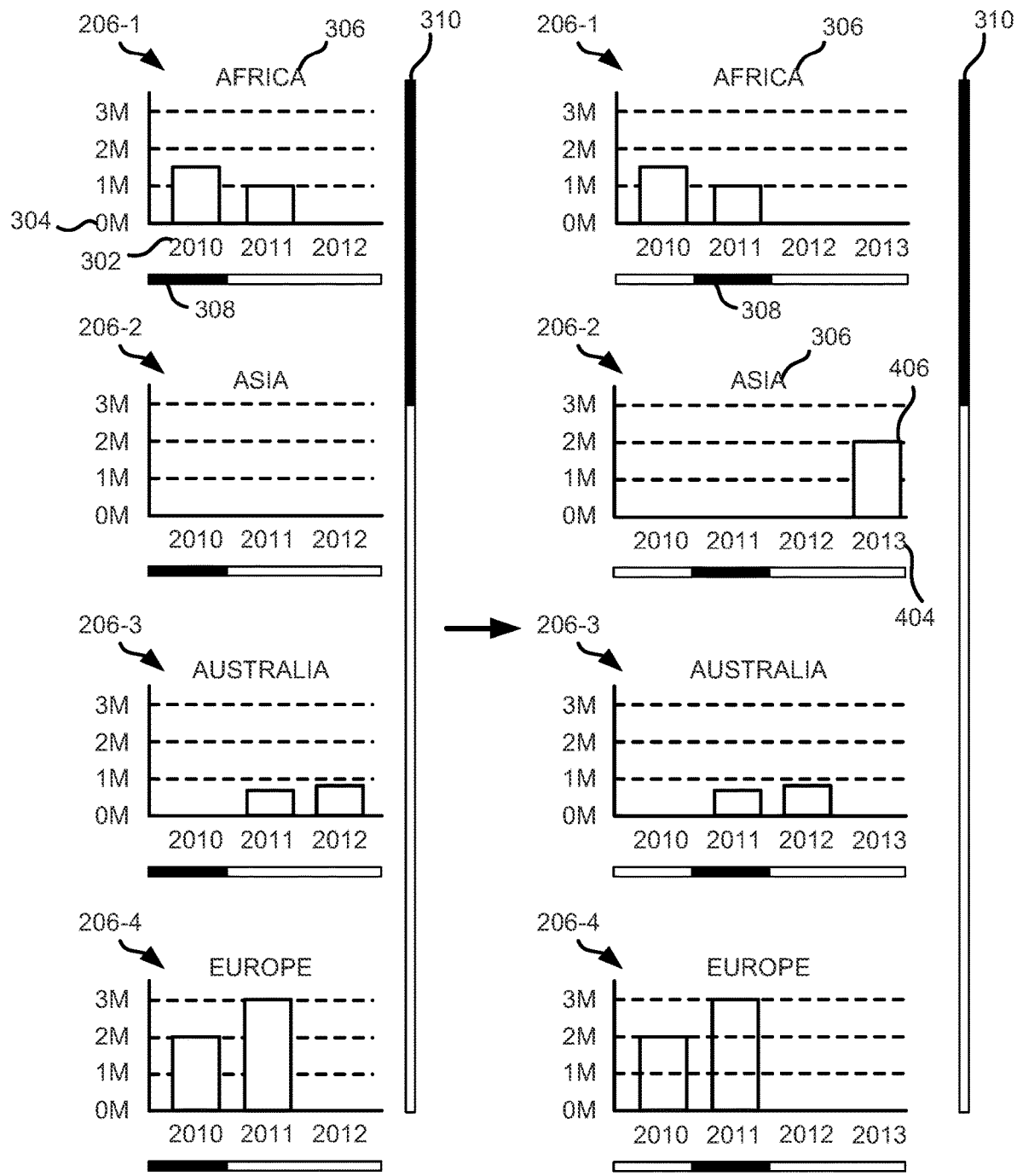
FIG. 4 shows a diagram of small multiples in which a second subset of a data set may be displayed together with a first subset of the data set, in accordance with an embodiment of the present disclosure.

Reference is made to FIGS. 1, 2, 3, 4, and 5A to 5D. FIG. 1 shows a block diagram of an apparatus 100 that may determine a subset of a data set to be output as result data to be displayed in small multiples, in accordance with an embodiment of the present disclosure. FIG. 2 shows a block diagram of an example system 200 that may include the apparatus 100 depicted in FIG. 1, in accordance with an embodiment of the present disclosure. FIG. 3 shows a diagram of small multiples in which a subset of a data set may be displayed, in accordance with an embodiment of the present disclosure. FIG. 4 shows a diagram of small multiples in which a second subset of a data set may be displayed together with a first subset of the data set, in accordance with an embodiment of the present disclosure. FIGS. 5A to 5D show diagrams of subsets of a data set in which an outer dimension value may be preserved when the outer dimension value is reachable by scrolling an inner dimension data, in accordance with an embodiment of the present disclosure. It should be understood that the apparatus 100 depicted in FIG. 1, the system 200 depicted in FIG. 2, and/or the features depicted in FIGS. 3, 4, and 5A to 5D may include additional features and that some of the features described herein may be removed and/or modified without departing from the scopes of the apparatus 100 and/or the system 200.

The apparatus 100 may include a processor 102 and a memory 110. The apparatus 100 may be a computing device, including a server, a node in a network (such as a data center), a desktop computer, a laptop computer, a tablet computer, a smartphone, an electronic device such as Internet of Things (IoT) device, and/or the like. The processor 102 may include a semiconductor-based microprocessor, a central processing unit (CPU), an application-specific integrated circuit (ASIC), a field-programmable gate array (FPGA), and/or other hardware device. In some examples, the apparatus 100 may include multiple processors and/or cores without departing from a scope of the apparatus. In this regard, references to a single processor as well as to a single memory may be understood to additionally or alternatively pertain to multiple processors and multiple memories.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-124 to determine a subset of a data set to be output as result data to be displayed in small multiples. The instructions 112-124 may be machine-readable instructions, e.g., non-transitory computer-readable instructions. In other examples, the apparatus 100 may include hardware logic blocks or a combination of instructions and hardware logic blocks to implement or execute functions corresponding to the instructions 112-124.

The processor 102 may fetch, decode, and execute the instructions 112 to receive a request for result data 202 from a requestor 204. The requestor 204 may be a computing device, including a desktop computer, a laptop computer, a tablet computer, a smartphone, an electronic device such as an IoT device, a server, a node in a network, and/or the like. In some examples, the request may be a request in a declarative visual query language, which may describe the requested data including the dimensions, a range of data points to be retrieved, and/or the like, without any specific instructions or details of the mechanisms involved to service the request. The requestor 204 may be connected to the apparatus 100 via a network 214, which may be the Internet, a local area network, and/or the like. In addition, the data set 210 may be stored remotely on a data store 212, on the apparatus 100, for instance in the memory 110, on a server (not shown) connected via the network 214, and/or the like.

The processor 102 may interpret the received request and may generate the result data 202 as small multiples 206. The processor 102 may also output the generated small multiples to the requestor 204 and the requestor 204 may display the small multiples 206. As depicted in FIG. 3, the processor 102 may generate the small multiples 206 to include multiple versions of the small multiples 206-1 to 206-n. In some examples, the small multiples 206-1 to 206-n may have more than two dimensions, for instance, inner dimensions 302, 304 and an outer dimension 306. In this instance, the multiple small multiples 206-1 to 206-n may be caused to be displayed based on different instances of the outer dimension 306. As shown in FIG. 3, the inner dimensions 302, 304 may be dimensions of the X and Y axes respectively, and may be the same for each of the versions of the small multiples 206-1 to 206-n. In addition, the outer dimension 306 may be a separate dimension that may differ in each of the versions of the small multiples 206-1 to 206-n.

The processor 102 may fetch, decode, and execute the instructions 114 to determine queries 208 to create the result data 202. The processor 102 may interpret the received request to determine efficient queries 208 to service the received request. That is, the processor 102 may determine queries 208 based on a type of the data or a type of the dimensions in the data set 210 from which the result data 202 is to be created. For instance, the processor 102 may determine the queries 208 based on whether the data in the data set is categorical data, continuous data, and/or the like. In some examples, the processor 102 may determine separate queries 208 for each of the dimensions 302, 304, 306 of a data set 210 based on the type of data in each of the dimensions 302, 304, 306.

The processor 102 may fetch, decode, and execute the instructions 116 to determine a subset 216 of the data set 210 based on the queries 208. In some examples, the processor 102 may determine the queries 208 based on efficient/appropriate data reduction strategies or a type of data associated with the requested result data 202. In some examples, the processor 102 may process each of the dimensions 302, 304, 306 of the small multiples 206 separately, and may determine an efficient/appropriate query for each of the dimensions 302, 304, 306. In this regard, the processor 102 may decompose the data set 210 by each of the dimensions 302, 304, 306 of the small multiples 206, apply an appropriate type of data reduction strategy for each of the dimensions 302, 304, 306, synchronize values of dimensions 302, 304, 306, and/or recompose the result data according to a hierarchy of the dimensions 302, 304, 306 of the small multiples 206.

By way of particular example, the processor 102 may identify a type of data reduction to be used for the subset 216 of the data set 210, and may determine the queries 208 based on the identified type of data reduction to be used for each of the dimensions 302, 304, 306. The type of data reduction may include windowing, topN, bottomN, sampling, high density sampling, and/or a combination thereof. Windowing may fetch a predetermined number of data points across a hierarchy of data. When additional data is requested, a new window of data may be fetched and stitched to a previous window of data. TopN and bottomN may order/rank a hierarchy of data. TopN may select a predetermined number of top N data points and bottomN may select a predetermined number of bottom N data points in the ordered data. Sampling may select a first, last, and N evenly distributed data points. High density sampling may cause the processor 102 to analyze a shape and space of the data set and may select relevant points to represent the shape and space of the data set.

By way of particular example and for purposes of illustration, the processor 102 may select the windowing, topN, or bottomN type of data reduction for categorical data (such as countries), and may select the sampling type of data reduction for continuous data (such as dates). The type of data reduction and efficient queries suitable for a particular type of data may be user-defined, based on testing/experimentation, modeling, prior knowledge, and/or the like. It should be understood that the apparatus 100 may include instructions to implement other types of data reduction strategies.

In some examples, the processor 102 may balance a size of data for the dimensions 302, 304, 306 based on the query results for each of the dimensions. For instance, the processor 102 may balance a size of each of the dimensions 302, 304, 306 based on actual data points in the data set 210. The processor 102 may give precedence to certain dimensions and may rebalance the sizes of the dimensions in case any of the dimensions does not have sufficient data to fill an allotted size. For instance, in a case where the allotted size is 100 series of data points but the data set only contains 10 series of data points, the processor 102 may dynamically increase the sizes of other dimensions.

The processor 102 may recompose results of the queries 208 to form the result data 202. In some examples, the data in the data set 210 may have a hierarchy, for instance, based on a hierarchy of the dimensions 302, 304, 306 of the small multiples 206. The processor 102 may recompose the results of the queries 208 according to the hierarchy of the dimensions 302, 304, 306 to form the result data 202.

The processor 102 may fetch, decode, and execute the instructions 118 to output the subset 216 of the data set 210 as the result data 202 to the requestor 204. The processor 102 may process the data in the result data 202 for the requestor 204 to display the data in the small multiples 206. By way of particular example and for purposes of illustration, as depicted in FIG. 4, the processor 102 may process the data such that the requestor 204 may display the small multiples 206-1 to 206-4 to include inner dimensions 302, 304 across values of an outer dimension 306. In this example, the inner dimension 302 may be years, the inner dimension 304 may be annual sales, and the outer dimension 306 may be continents.

The processor 102 may synchronize inner dimension 302 data of the small multiples 206-1 to 206-4 across each instance of outer dimension 306 data of the small multiples 206-1 to 206-4. In this regard, the processor 102 may synchronize a value of the inner dimension 302 (years dimension) for each of the small multiples 206-1 to 206-4 to include the years 2010 to 2012. For instance, the processor 102 may cause display of the small multiple 206-3 for Australia to have an inner dimension 302 value from year 2010 to 2012, even in a case where there is no data point corresponding to the year 2010. As such, the processor 102 may synchronize the inner dimension 302 data across each instance of the outer dimension 306 data, which may provide a useful comparison view of the result data. In some examples, the processor 102 may employ encoding techniques to the result data 202 to cause the requestor 204 to display the small multiples 206-1 to 206-4 to include the synchronized dimension values.

The processor 102 may fetch, decode, and execute the instructions 120 to receive a request for additional result data 218 from the requestor 204. The request for additional result data 218 may be for data immediately after or adjacent to the result data 202 associated with a previous request. The processor 102 may determine queries 208 to create the additional result data 218 in the same manner as for the result data 202 as previously described.

The processor 102 may fetch, decode, and execute the instructions 122 to determine a second subset 220 of the data set 210 to be displayed in the small multiples 206. In some examples, a scroll bar 308 may be displayed with the small multiples 206. The processor 102 may determine the second subset 220 of the data set 210 based on a scroll input at the scroll bar 308. In this regard, the processor 102 may identify the second subset 220 of the data set 210 to correspond to a user selection at the scroll bar 308. Additionally or alternatively, scroll bars may be provided to scroll other dimensions, for instance, the inner dimension 304, the outer dimension 306, and/or the like. For instance, a scroll bar 310 may be provided to scroll the outer dimension 306.

The processor 102 may fetch, decode, and execute the instructions 124 to output the second subset 220 of the data set 210 as the additional result data 218 to the requestor 204. In some examples, the processor 102 may output the additional result data 218 to be stitched to the result data 202, in order for the additional result data 218 and the result data 202 to be displayed together in the small multiples 206. By way of particular example and for purposes of illustration, as depicted in FIG. 4, based on a scroll input at the scroll bar 308, the processor 102 may cause the requestor 204 to display the small multiples 206 to be updated to include a data point 406 (2 M) for the inner dimension 302 value for the year 2013, across each of the outer dimension 306 values (continents). Alternatively or additionally, the scroll bar 310 may be provided to scroll the outer dimension 306 value. In some examples, the processor 102 may cause the requestor 204 to display additional small multiples corresponding to an additional outer dimension 306 value based on a scroll input at the scroll bar 310.

In some examples, the processor 102 may process the result data 202 to preserve certain dimension values for display in the small multiples 206 during data reduction. By way of particular example and for purposes of illustration, FIG. 5A shows an example data set 502 for small multiples, such as the small multiples 206-1 to 206-n depicted in FIG. 3, and data structures 504-1 to 504-3 for the small multiples 206-1 to 206-n that may include subsets 514, 518, 520 of the data set 502. In this example, the data set 502 may include an inner dimension 506 for "year", an inner dimension 508 for "sales", and an outer dimension 510 for "continent".

The processor 102 may incrementally load the data set 502 in the subsets 514, 518, 520 of data based on input to a scroll bar, such as the scroll bar 308 and/or the scroll bar 310 depicted in FIG. 3. In this example, the processor 102 may output the data set 502 in batches of two continents and two years. In this case, as depicted in FIG. 5B, the processor 102 may output as an initial data load the subset 514, which may be a subset of the data set 502 that includes a window of two continents (Africa and Asia) and two years (2010 and 2011). Here, the outer dimension value 516 (Asia) may not have a corresponding inner dimension data 506 that is to be displayed since the year 2013 is outside of the initial two year window of 2010-2011. However, the processor 102 may preserve the outer dimension value 516 (Asia) in the data structure 504-1 so that the outer dimension value 516 (Asia) may be included in the data structure 504-1 since the inner dimension 506 data (year 2013) associated with the outer dimension value 516 (Asia) may be reachable, for instance, by scrolling the scroll bar 308.

As depicted in FIG. 5C, the processor 102 may output the second subset 518 of the data set 502 to form the data structure 504-2, for instance, based on a scroll input to load two additional continents (Australia and Europe). In this instance, the inner dimension data (Year and Sales) associated with the outer dimension value 516 (Asia) may still not be included in the data structure 504-2 because the corresponding year window has not been reached.

As depicted in FIG. 5D, the processor 102 may output the third subset 520 of the data set 502 to form the data structure 504-3, for instance, based on a scroll input to load two additional continents and two additional years (2012 and 2013). In this instance, the inner dimension data (2013 and 2 M) corresponding with the outer dimension value 516 (Asia) may be included in the data structure 504-3 since the corresponding year window (2012 to 2013) has been reached.

Figure 6:
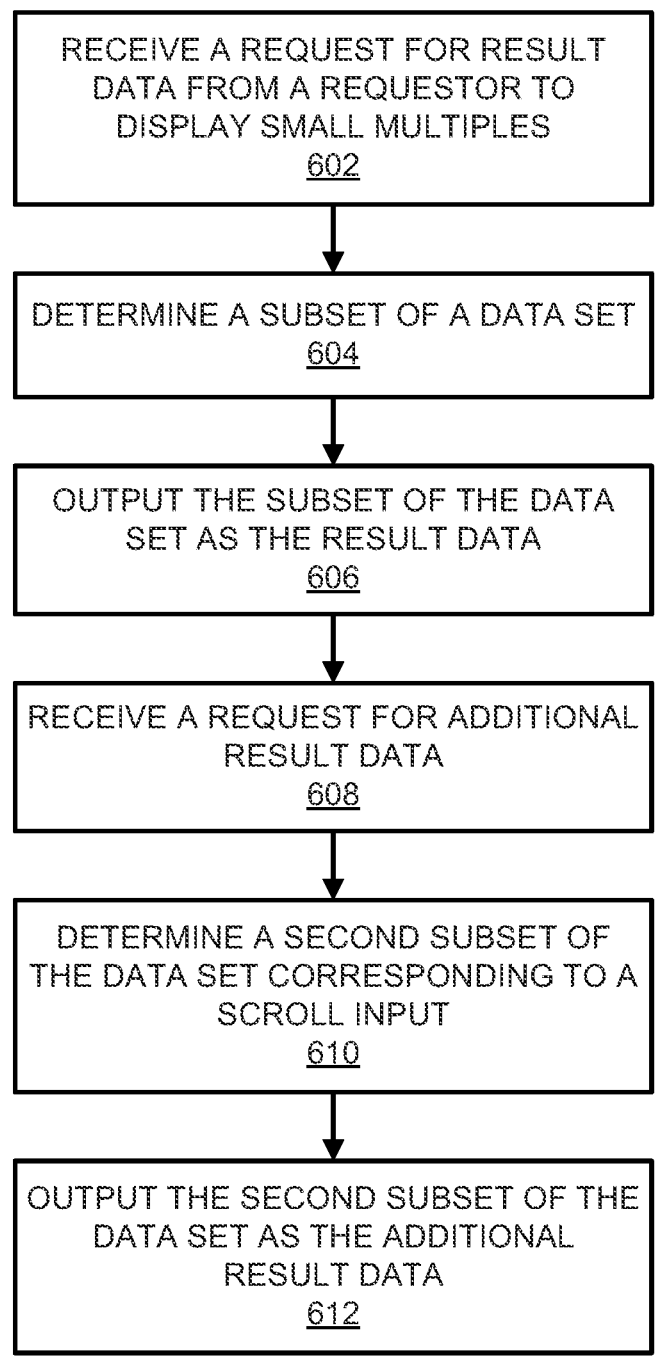
FIG. 6 shows a flow diagram of a method for outputting a subset of a data set as result data to be displayed in small multiples, and outputting a second subset of the data set as additional result data to be displayed in the small multiples, in accordance with an embodiment of the present disclosure.

Various manners in which a processor implemented on the apparatus 100 may operate are discussed in greater detail with respect to the method 600 depicted in FIG. 6. FIG. 6 depicts a flow diagram of a method 600 for outputting a subset 216 of a data set 210 as result data 202 to be displayed in small multiples 206, and outputting a second subset 220 of the data set 210 as additional result data 218 to be displayed in the small multiples 206, in accordance with an embodiment of the present disclosure. It should be understood that the method 600 depicted in FIG. 6 may include additional operations and that some of the operations described therein may be removed and/or modified without departing from the scope of the method 600. The description of the method 600 is made with reference to the features depicted in FIGS. 1, 2, 3, 4, and 5A to 5D for purposes of illustration.

At block 602, the processor 102 may receive a request for result data 202 from a requestor 204 to display the small multiples 206. The request for result data 202 may be sent over a network 214 from the requestor 204 to the apparatus 100. In some examples, the request may be implemented as a declarative query language request.

At block 604, the processor 102 may determine a subset 216 of a data set 210 associated with the small multiples 206. In this regard, the processor 102 may decompose the data set 210 by dimensions of the small multiples 206. The processor 102 may determine queries 208 associated with the dimensions and may execute the queries 208 for each of the dimensions.

In some examples, the processor 102 may identify a type of data reduction to be used to determine the subset 216 of the data set 210. The type of data reduction may include windowing, topN, bottomN, sampling, high density sampling, or a combination thereof, as previously described. The processor 102 may determine queries to create the result data 202 based on the identified type of data reduction. In this regard, the processor 102 may determine the type of data reduction that is suitable for a particular type of data in each dimension of the decomposed data set 210.

At block 606, the processor 102 may output the subset 216 of the data set 210 as the result data 202 to the requestor 204 to be displayed in the small multiples 206. In some examples, the processor 102 may process the results of the queries 208 to balance a size of data for each of the dimensions. In any regard, the processor 102 may recompose the results of the queries 208 to form the result data 202. In this regard, the dimensions of the small multiples 206 may have a hierarchy and the processor 102 may recompose the results of the queries 208 according to the hierarchy of the dimensions.

At block 608, the processor 102 may receive a request for additional result data 218 from the requestor 204. In some examples, a scroll bar such as the scroll bars 308 or 310 depicted in FIGS. 3 and 4 may be displayed with the small multiples 206, and the processor 102 may determine the additional result data 218 based on a scroll input at the small multiples 206.

At block 610, the processor 102 may determine a second subset 220 of the data set 210 corresponding to the scroll input. The processor 102 may create the additional result data 218 in the same manner as the result data 202 as previously described.

At block 612, the processor 102 may output the second subset 220 of the data set 210 as the additional result data 218 to the requestor 204 to be displayed in the small multiples 206. The processor 102 may output the additional result data 218 to be stitched to the result data 202 such that the additional result data 218 and the result data 202 may be displayed together in the small multiples 206.

In some examples, the processor 102 may determine that an outer dimension value, such as the outer dimension value 306 (Asia) for small multiple 206-2 as depicted in FIG. 4 or the outer dimension value 516 (Asia) as depicted in FIG. 5B, may be reachable by scrolling an inner dimension data among the dimensions, such as the inner dimensions 302, 506 as depicted in FIGS. 3, 4, and 5. Based on a determination that the outer dimension value may be reachable by scrolling the inner dimension data, the processor 102 may preserve the outer dimension value in the result data 202 to be displayed in the small multiples 206. In some examples, the processor 102 may synchronize the inner dimension data among dimensions of the small multiples 206 across each instance of outer dimension value among the dimensions.

Some or all of the operations set forth in the method 600 may be included as utilities, programs, or subprograms, in any desired computer accessible medium. In addition, the method 600 may be embodied by computer programs, which may exist in a variety of forms both active and inactive. For example, they may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 7:
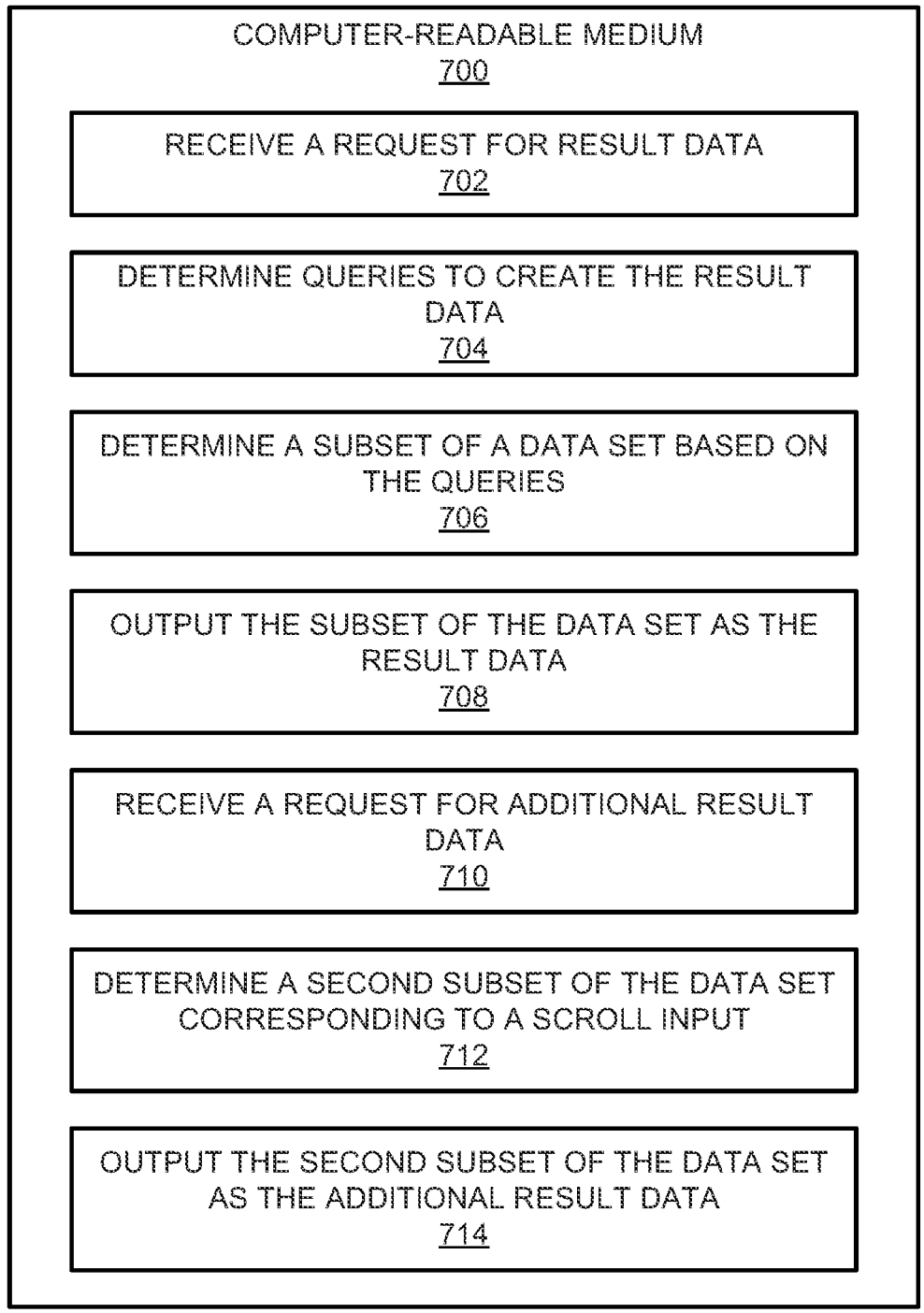
FIG. 7 depicts a block diagram of a computer-readable medium that may have stored thereon computer-readable instructions to output a subset of a data set as result data to be displayed in small multiples and to output a second subset of the data set as additional result data to be stitched to the result data to be displayed together with the result data in the small multiples, in accordance with an embodiment of the present disclosure.

Turning now to FIG. 7, there is shown a block diagram of a computer-readable medium 700 that may have stored thereon computer-readable instructions to output a subset of a data set as result data to be displayed in small multiples, and to output a second subset of the data set as additional result data to be stitched to the result data to be displayed together with the result data in the small multiples, in accordance with an embodiment of the present disclosure. It should be understood that the computer-readable medium 700 depicted in FIG. 7 may include additional instructions and that some of the instructions described herein may be removed and/or modified without departing from the scope of the computer-readable medium 700 disclosed herein. The description of the computer-readable medium 700 is made with reference to the features depicted in FIGS. 1, 2, 3, 4, and 5A to 5D for purposes of illustration. The computer-readable medium 700 may be a non-transitory computer-readable medium. The term "non-transitory" does not encompass transitory propagating signals.

The computer-readable medium 700 may have stored thereon machine-readable instructions 702-714 that a processor disposed in an apparatus 100 may execute. The computer-readable medium 700 may be an electronic, magnetic, optical, or other physical storage device that contains or stores executable instructions. The computer-readable medium 700 may be, for example, Random Access memory (RAM), an Electrically Erasable Programmable Read-Only Memory (EEPROM), a storage device, an optical disc, and the like.

The processor may fetch, decode, and execute the instructions 702 to receive a request for result data 202 from a requestor 204. The processor may fetch, decode, and execute the instructions 704 to determine queries 208 to create the result data 202.

The processor may fetch, decode, and execute the instructions 706 to determine a subset 216 of a data set 210 based on the queries 208. In some examples, the requestor 204 may display the subset 216 of the data set 210 in small multiples 206. The processor may fetch, decode, and execute the instructions 708 to output the subset 216 of the data set 210 as the result data 202 to the requestor 204.

The processor may fetch, decode, and execute the instructions 710 to receive a request for additional result data 218 from the requestor 204. The processor 102 may associate the request for additional result data 218 with a scroll input at the small multiples 206 as discussed herein.

The processor may fetch, decode, and execute the instructions 712 to determine a second subset 220 of the data set corresponding to the scroll input. The processor may fetch, decode, and execute the instructions 714 to output the second subset 220 of the data set as the additional result data 218 to the requestor 204. The additional result data 218 may be stitched to the result data 202 to be displayed together with the result data 202 in the small multiples 206.

In some examples, the processor 102 may decompose the data set 210 by dimensions of the small multiples 206. The processor 102 may execute the queries 208 for the dimensions, and in some instances, a specific query may be executed separately for a corresponding dimension. In some examples, the dimensions may have a hierarchy, and the processor 102 may recompose results of the queries 208 to form the result data 202 according to the hierarchy of the dimensions. In some examples, the processor 102 may decompose the data set 210 by dimensions of the small multiples 206, balance a size of the data for the dimensions, and recompose results of the queries to form the result data.

In some examples, the processor 102 may determine that an outer dimension value 306 of the small multiples 206 may be reachable by scrolling an inner dimension data 302, 304 of the small multiples 206. Based on a determination that the outer dimension value 306 of the small multiples 206 is reachable by scrolling, the processor 102 may preserve the outer dimension value 306 in the result data 202 for display in the small multiples 206. In some examples, the processor may synchronize inner dimension data 302, 304 across each instance of an outer dimension value 306 of the small multiples 206.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine-readable instructions that when executed by the processor, cause the processor to:
   cause a computing device to display a first small multiple and a second small multiple, the first small multiple and the second small multiple comprising a first subset of a data set, the first small multiple and the second small multiple being visual objects that represent the data set and having common axes, scales, or a combination thereof, wherein the first small multiple and the second small multiple have common inner dimensions and are each an instance of a value of a common outer dimension;
   receive an input at the first small multiple, the second small multiple, or both the first small multiple and the second small multiple, the received input being correlated to a value of a dimension of the first small multiple, the second small multiple, or both the first small multiple and the second small multiple;
   based on the received input, determine a second subset of the data set to be displayed in the first small multiple and the second small multiple based on the value of the dimension correlated to the received input; and
   send the second subset of the data set to the computing device and cause the computing device to:
   stitch the second subset of the data set to the first subset of the data set; and
   display portions of the first subset and the second subset in respective ones of the first small multiple and the second small multiple to which the portions belong.

2. The apparatus of claim 1, wherein the instructions cause the processor to:
   cause the computing device to display a third small multiple based on a second input, the second input being a scroll input at a scroll bar correlated to the common outer dimension of the first small multiple and the second small multiple, wherein the third small multiple is correlated to a different value of the common outer dimension as the first small multiple and the second small multiple.

3. The apparatus of claim 1, wherein the instructions cause the processor to:
cause the computing device to remove the second small multiple based on a third input, the third input being a scroll input at a scroll bar correlated to the common outer dimension of the first small multiple and the second small multiple.

4. The apparatus of claim 1, wherein the instructions cause the processor to:
decompose the data set by dimensions of the first small multiple and the second small multiple, the dimensions having a hierarchy;
execute queries for each of the dimensions;
balance a size of data for the dimensions; and
recompose results of the queries to form the second subset of the data set, the results of the queries being recomposed according to the hierarchy of the dimensions.

5. The apparatus of claim 1, wherein the instructions cause the processor to:
apply a type of data reduction to determine the second subset of the data set, synchronize dimensions of the first small multiple and the second small multiple, recompose data for the second subset according to a hierarchy of the dimensions of the first small multiple, the second small multiple, or a combination thereof.

6. The apparatus of claim 1, wherein the instructions cause the processor to:
identify a type of data reduction to be used to determine the second subset of the data set, the type of data reduction including windowing, topN, bottomN, sampling, high density sampling, or a combination thereof; and
determine queries for dimensions of the first small multiple and the second small multiple based on the identified type of data reduction.

7. The apparatus of claim 1, wherein the instructions cause the processor to:
determine that an outer dimension value of the first small multiple, the second small multiple, or both the first small multiple and the second small multiple is reachable by scrolling an inner dimension data of the first small multiple, the second small multiple, or both the first small multiple and the second small multiple; and
based on a determination that the outer dimension value is reachable by scrolling the inner dimension data, preserve the determined outer dimension value in the second subset of the data set for display in respective ones of the first small multiple and the second small multiple.

8. The apparatus of claim 1, wherein the instructions cause the processor to:
cause the computing device to synchronize the common axes, scales, or the combination thereof of the first small multiple and the second small multiple.

9. A method comprising:
causing, by a processor, a first small multiple and a second small multiple comprising a first subset of a data set to be displayed, the first small multiple and the second small multiple being visual objects to represent the data set and having common axes, scales, or a combination thereof, wherein the first small multiple and the second small multiple have common inner dimensions and are each an instance of a value of a common outer dimension;
receiving, by the processor, an input at the first small multiple, the second small multiple, or both the first small multiple and the second small multiple, the received input being correlated to a value of a dimension of the first small multiple, the second small multiple, or both the first small multiple and the second small multiple;
based on the received input, receiving, by the processor, a second subset of the data set based on the value of the dimension correlated to the received input; and
causing, by the processor, in the first small multiple and the second small multiple, the second subset of the data set to be stitched to the first subset of the data set to be displayed; and
causing, by the processor, to be displayed portions of the first subset and the second subset in respective ones of the first small multiple and the second small multiple to which the portions belong.

10. The method of claim 9, further comprising:
receiving a second input, the second input being a scroll input at a scroll bar correlated to the common outer dimension of the first small multiple and the second small multiple; and
causing a third small multiple to be displayed based on the second input, the third small multiple having common inner dimensions as the first small multiple and the second small multiple, and being correlated to a different value of the common outer dimension as the first small multiple and the second small multiple.

11. The method of claim 9, further comprising:
receiving a third input, the third input being a scroll input at a scroll bar correlated to the common outer dimension of the first small multiple and the second small multiple; and
removing the second small multiple and data correlated with the second small multiple based on the third input.

12. The method of claim 9, further comprising:
decomposing the data set by dimensions of the first small multiple and the second small multiple, the dimensions having a hierarchy;
determining queries associated with the dimensions;
executing the queries for each of the dimensions;
balancing a size of data for each of the dimensions; and
recomposing results of the queries to form the second subset of the data set, the results of the queries being recomposed according to the hierarchy of the dimensions.

13. The method of claim 9, further comprising:
applying a type of data reduction to determine the second subset of the data set;
synchronizing dimensions of the first small multiple and the second small multiple; and
recomposing query results for each of the dimensions according to a hierarchy of the dimensions to form the second subset of the data set.

14. The method of claim 9, further comprising:
identifying a type of data reduction to be used to determine the second subset of the data set, the type of data reduction including windowing, topN, bottomN, sampling, high density sampling, or a combination thereof; and
determining queries to create the second subset of the data set based on the identified type of data reduction.

15. The method of claim 9, further comprising:
determining that an outer dimension value among dimensions of the first small multiple, the second small multiple, or both the first small multiple and the second small multiple is reachable by scrolling an inner dimension data among the dimensions; and based on a determination that the outer dimension value is reachable by scrolling the inner dimension data, preserving the outer dimension value in the second subset of the data set to be displayed in respective ones of the first small multiple and the second small multiple.

16. The method of claim 9, further comprising:

synchronizing common axes, scales, or a combination thereof of the first small multiple and the second small multiple.

17. A non-transitory computer-readable medium on which is stored computer-readable instructions that, when executed by a processor, cause the processor to:

cause a first small multiple and a second small multiple comprising a first subset of a data set to be displayed, the first small multiple and the second small multiple being visual objects to represent the data set and having common axes, scales, or a combination thereof, wherein the first small multiple and the second small multiple have common inner dimensions and are each an instance of a value of an outer dimension;

receive a scroll input at the first small multiple, the second small multiple, or both the first small multiple and the second small multiple, the received scroll input being correlated to a value of a dimension of the first small multiple, the second small multiple, or both the first small multiple and the second small multiple;

responsive to the received scroll input, receive a second subset of the data set correlated to the value of the dimension in the received scroll input; and cause the second subset of the data set to be displayed in the first small multiple and the second small multiple, wherein the second subset of the data set is stitched to the first subset of the data set, wherein portions of the first subset and the second subset are to be displayed in respective ones of the first small multiple and the second small multiple to which the portions belong.

18. The non-transitory computer-readable medium of claim 17, wherein the instructions cause the processor to:

receive a second scroll input, the second scroll input being a scroll input at a scroll bar correlated to the common outer dimension of the first small multiple and the second small multiple; and cause a third small multiple to be displayed based on the second scroll input, the third small multiple being correlated with a value of the common outer dimension indicated by the second scroll input.

19. The non-transitory computer-readable medium of claim 17, wherein the instructions cause the processor to:

cause the second small multiple to be removed based on a third input, the third input being a scroll input at a scroll bar correlated to the common outer dimension of the first small multiple and the second small multiple.

20. The non-transitory computer-readable medium of claim 17, wherein the instructions cause the processor to:

determine that an outer dimension value of the first small multiple, the second small multiple, or both the first small multiple and the second small multiple is reachable by scrolling an inner dimension data of the first small multiple, the second small multiple, or both the first small multiple and the second small multiple; and based on a determination that the outer dimension value of the first small multiple, the second small multiple, or both the first small multiple and the second small multiple is reachable by scrolling, preserve the outer dimension value in the second subset of the data set for display in respective ones of the first small multiple and the second small multiple.

\* \* \* \* \*